United States Patent
Zheng

(10) Patent No.: US 9,653,030 B2
(45) Date of Patent: May 16, 2017

(54) DRIVING METHOD FOR LIQUID CRYSTAL DISPLAY PANEL, CORE PANEL OF DISPLAY, AND LIQUID CRYSTAL DISPLAY DEVICE

(71) Applicant: Shenzhen China Star Optoelectronics Technology Co., Ltd., Shenzhen, Guangdong (CN)

(72) Inventor: Hua Zheng, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,839

(22) PCT Filed: Jan. 20, 2015

(86) PCT No.: PCT/CN2015/071136
§ 371 (c)(1),
(2) Date: May 9, 2016

(87) PCT Pub. No.: WO2016/095319
PCT Pub. Date: Jun. 23, 2016

(65) Prior Publication Data
US 2016/0247469 A1    Aug. 25, 2016

(30) Foreign Application Priority Data
Dec. 18, 2014   (CN) .......................... 2014 1 0795929

(51) Int. Cl.
*G09G 3/36*     (2006.01)
*G09G 3/00*     (2006.01)
*H04N 13/00*    (2006.01)

(52) U.S. Cl.
CPC .......... *G09G 3/3614* (2013.01); *G09G 3/003* (2013.01); *G09G 3/3674* (2013.01); *H04N 13/00* (2013.01);
(Continued)

(58) Field of Classification Search
None
See application file for complete search history.

(56) References Cited

U.S. PATENT DOCUMENTS

2007/0216766 A1*  9/2007  Nakaya ............. H04N 13/0048
                                                  348/46

FOREIGN PATENT DOCUMENTS

CN     101039441 A     9/2007
CN     101562756 A     10/2009
(Continued)

OTHER PUBLICATIONS

Office Action and Search Report, May 4, 2016, China.
International Search Report and Written Opinion, Jan. 20, 2015, China.

*Primary Examiner* — Kenneth B Lee, Jr.
(74) *Attorney, Agent, or Firm* — Kim Winston LLP

(57) ABSTRACT

A method for driving a liquid crystal display panel is disclosed. In 3D display mode, said method comprising the following steps: providing a scanning signal to a second scanning line of a pixel row N, so as to turn on a second switching unit; and providing, after X scanning cycles, a scanning signal to a first scanning line of the pixel row N to turn on a first switching unit, so that a corresponding pixel unit is charged by image data information of a data line. A polarity of said image data information is reversed once through each two frames. According to the method of the present disclosure, the shutter glass 3D image can be displayed without image spiking, while it is not necessary to
(Continued)

change the structures of the liquid crystal display panel, the display panel control circuit, the core panel of the display, and other kinds of hardware.

11 Claims, 5 Drawing Sheets

(52) U.S. Cl.
CPC .............. *G09G 2310/0251* (2013.01); *G09G 2320/0204* (2013.01); *G09G 2320/0242* (2013.01); *G09G 2340/0492* (2013.01)

(56) References Cited

FOREIGN PATENT DOCUMENTS

| | | |
|---|---|---|
| CN | 102081911 A | 6/2011 |
| CN | 102113332 A | 6/2011 |
| CN | 102163413 A | 8/2011 |
| CN | 102655599 A | 9/2012 |
| CN | 102915716 A | 2/2013 |
| CN | 103439809 A | 12/2013 |
| CN | 103605224 A | 2/2014 |
| JP | 1996029727 A | 1/1990 |

\* cited by examiner

DRIVING METHOD FOR LIQUID CRYSTAL DISPLAY PANEL, CORE PANEL OF DISPLAY, AND LIQUID CRYSTAL DISPLAY DEVICE

CROSS REFERENCE TO RELATED APPLICATION

The present application claims benefit of Chinese patent application CN 201410795929.8, entitled "Driving Method for Liquid Crystal Display Panel, Core Panel of Display, and Liquid Crystal Display Device" and filed on Dec. 18, 2014, which is incorporated herein by reference.

FIELD OF THE INVENTION

The present disclosure relates to the technical field of liquid crystal display, and particularly to a driving method for liquid crystal display panel, a core panel of display, and a liquid crystal display device.

BACKGROUND OF THE INVENTION

In the shutter glass three dimensional (3D) display technology, the 3D display effect is realized through improving a refresh rate of the images. One frame image can be separated into two frame images corresponding to the left eye and the right eye respectively through the shutter glass 3D display technology. The two frame images are displayed continuously and alternately on the Liquid Crystal Display (LCD). The switches of the lenses of the shutter glass are controlled synchronously, so that the left eye and the right eye can see the corresponding image at the right moment respectively. The original resolution of the images can be maintained through the shutter glass 3D display technology. In this case, the users can enjoy high-definition 3D display effect easily, and moreover, the brightness of the images would not be reduced.

The Vertical Alignment (VA) LCD has a fairly high contrast and wide viewing angle, and is widely used in the liquid crystal televisions with large screen at present. However, there is a disadvantage in the VA LCD, i.e., the color shift phenomenon under large viewing angles. For example, when the skin of a person, especially an Asian person, is displayed, the color shift phenomenon would occur. In the liquid crystal display panel using VA technology, a low color shift display effect can be realized through charge-sharing method.

In the prior art, one of the premises that the charge-sharing method can be used is that a polarity of a data signal voltage of a pixel is reversed once through each frame cycle. However, when the shutter glass 3D display technology is applied under this premise, the phenomenon that "the left eye frame images always have the same polarity (for example, positive polarity), and the right eye frame images always have another polarity (for example, negative polarity)" would occur in the liquid crystal display panel. In the shutter glass 3D display technology, the gray-scale of the left eye frame image is different from that of the right eye frame image. In this case, when a 3D image is displayed for a certain time period in a freeze-frame manner, the phenomenon like "direct current residue" would occur since the pixels have worked under imbalanced positive/negative voltage for a long time, which would lead to "3D image spiking" in the display panel. Consequently, in the shutter glass 3D display technology of a VA liquid crystal display panel, the low color shift phenomenon cannot be realized through charge sharing method.

Therefore, a new method for driving the display is needed to solve the aforesaid technical problem.

SUMMARY OF THE INVENTION

The present disclosure provides a method for driving liquid crystal display panel, whereby 3D images can be displayed. In 3D display mode, said method comprising the following steps:

providing a scanning signal to a second scanning line of a pixel row N, so as to turn on a second switching unit; and providing, after X scanning cycles, a scanning signal to a first scanning line of the pixel row N to turn on a first switching unit, so that a corresponding pixel unit is charged by image data information of a data line, wherein the second scanning line of the pixel row N is connected with a first scanning line of a pixel row N+X, N ranging from 0 to P−X, X ranging from 0 to m, P and m being positive integers, P being far larger than m, and P scanning cycles being equal to a scanning time needed to display one frame image; and wherein said image data information is a data information corresponding to an image obtained after an original image is reconstructed, and a polarity of said image data information is reversed once through each two frames.

According to one embodiment, in two dimensional (2D) display mode, said method comprising the following steps:

providing a scanning signal to the first scanning line to turn on the first switching unit, thereby charging the corresponding pixel unit;

providing, after X scanning cycles, a scanning signal to the second scanning line to turn on the second switching unit, so that a charge of a corresponding pixel unit is shared to reduce color shift.

According to one embodiment, said liquid crystal display panel is a vertical alignment liquid crystal panel and has P pixel rows;

wherein the color shift of the liquid crystal panel is reduced through charge sharing method; and wherein said 3D display mode is realized through a shutter glass 3D display technology.

According to one embodiment, said method further comprising: grouping pixel rows taking X pixel rows as an unit and according to a sequence of the scanning signal to be provided in 2D display mode, so that it is guaranteed that all other groups except a first group comprise X pixel rows, and G pixel row groups are obtained, wherein a sequence of the scanning signal to be provided to said G pixel row groups in 3D display mode is opposite to that in 2D display mode.

According to one embodiment, a sequence of the scanning signal to be provided to the pixel rows in one pixel row group corresponds to that in other groups.

According to another aspect, the present disclosure further provides a core panel of a liquid crystal display, said core panel comprising:

an image reconstruction unit, used for reconstructing an original image frame in 3D display mode; and an image output unit, used for outputting data information corresponding to the original image frame in 2D display mode, and outputting data information corresponding to a reconstructed image in 3D display mode.

According to one embodiment, said image reconstruction unit reconstructs an image based on a sequence of a scanning signal to be provided to a pixel row.

According to one embodiment, said image reconstruction unit rotates the original image frame about a horizontal central axis so as to obtain the reconstructed image.

According to another aspect, the present disclosure further provides a liquid crystal display device, comprising:
a core panel, comprising:
an image reconstruction unit, used for reconstructing an original image frame in 3D display mode; and
an image output unit, used for outputting data information corresponding to the original image frame in 2D display mode, and outputting data information corresponding to a reconstructed image in 3D display mode; and
a display panel control circuit board, used for providing a driving signal to said display panel in accordance with a following driving method, so that a 2D image with low color shift is displayed based on data information corresponding to an original image frame in 2D display mode, and a 3D image without image spiking is displayed based on data information corresponding to a reconstructed image in 3D display mode.

According to one embodiment, said image reconstruction unit reconstructs an image based on a sequence of a scanning signal to be provided to a pixel row.

According to one embodiment, said image reconstruction unit rotates the original image frame about a horizontal central axis so as to obtain the reconstructed image.

Compared with the prior art, the present disclosure has the following advantages.

1. The 3D image display can be realized through shutter glass 3D display technology without image spiking.

2. The 2D images can be displayed normally with satisfactory low color shift display effect.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings are used to provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

In order to solve the color shift problem in a VA liquid crystal display panel, the traditional method in the prior art is to form two groups of sub pixels in one pixel. In this case, different relation curves between the transmissivity and the applied voltage can be generated in the two groups of sub pixels respectively, so that the distortion of the relation curve between the transmissivity and the applied voltage under wide viewing angles can be compensated. Specifically, the charge sharing method can be used.

In the charge sharing method, each sub pixel unit in the liquid crystal display panel is divided into two regions, i.e., a main region and a sub region. The charge sharing method is applied, so that a charge voltage of the main region is different from that of the sub region. Therefore, each pixel in the liquid crystal display panel is connected with two scanning lines, wherein a first scanning line is connected with a first switching unit and used for charging pixel electrodes in the two regions, and a second scanning line is connected with a second switching unit and used for enabling the charge voltages of pixel electrodes in the two regions being different from each other.

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Figure 1:
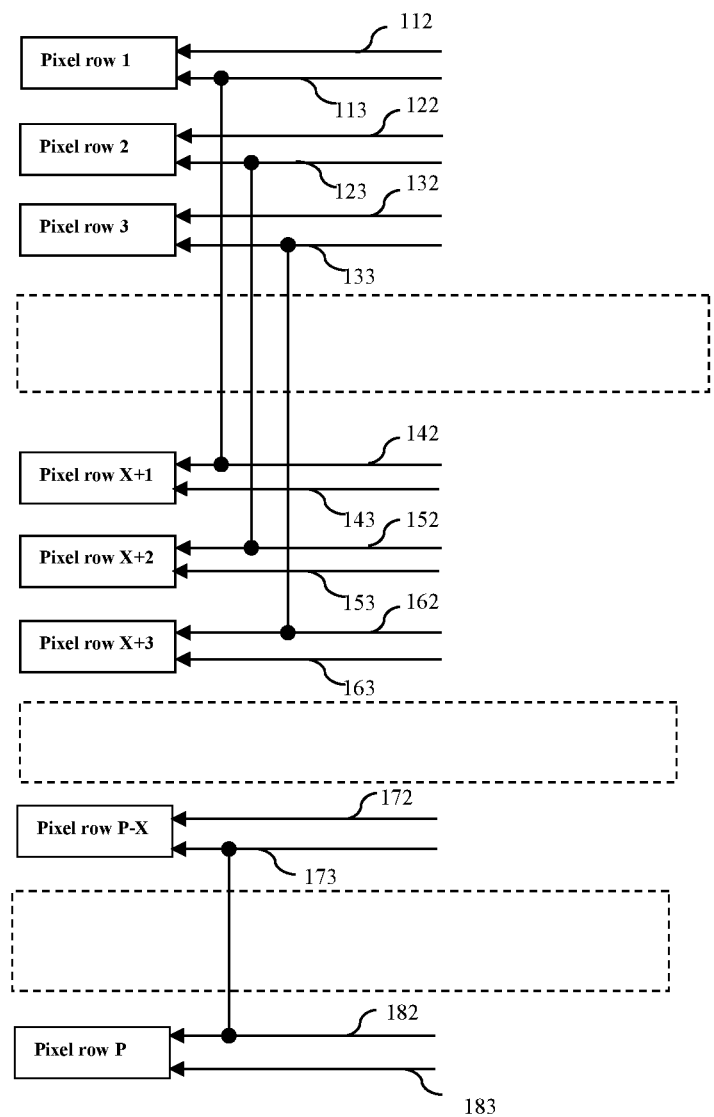
FIG. 1 schematically shows a VA liquid crystal display panel using charge sharing method.

According to the present embodiment, the liquid crystal display panel comprises a plurality of pixel rows, for example, P pixel rows. As shown in FIG. 1, pixel row 1, pixel row 2, pixel row 3, pixel row X+1, pixel row X+2, pixel row X+3, pixel row P−X, and pixel row P are part of the pixel rows in the liquid crystal display panel. As shown in FIG. 1 again, the pixel rows comprise first scanning lines (112, 122, 132, . . . , 142, 152, 162, 172, 182) and second scanning lines (113, 123, 133, . . . , 143, 153, 163, 173, 183).

In order to simplify the implementation thereof, a second scanning line of a pixel row N is connected with a first scanning line of a pixel row N+X, N ranging from 0 to P−X, X ranging from 0 to m, P and m being positive integers, P being far larger than m, and P scanning cycles being equal to a scanning period needed to display one frame image. As shown in FIG. 1, the second scanning lines of the pixel rows 1, 2, 3, and P−X are connected with the first scanning lines of the pixel rows X+1, X+2, X+3, and P respectively. When the liquid crystal display panel works in 2D display mode, if the scanning signals are provided to the first scanning lines in each pixel row from 1 to P in sequence, for the pixels in each row, a first switching unit thereof is turned on first so as to charge a pixel electrode thereof, and a second switching unit thereof is turned on then after X scanning cycles so as to perform charge sharing.

Based on the above connection structure, in the prior art, one of the premises that the charge sharing method can be used is that a polarity of a data signal voltage of a pixel electrode is reversed once through each frame. On this premise, the shutter glass 3D images cannot be displayed normally. The reason is that when the shutter glass 3D display technology is applied under this premise, the phenomenon that "the left eye frame images always have the same polarity (for example, positive polarity), and the right eye frame images always have another polarity (for example, negative polarity)" would occur in the liquid crystal display panel. In the shutter glass 3D display technology, the gray-scale of the left eye frame image is different from that of the right eye frame image. In this case, when a 3D image is displayed for a certain time period in a freeze-frame manner, the phenomenon like "direct current residue" would occur since the pixels have worked under imbalanced positive/negative voltage for a long time, which would lead to "3D image spiking" in the display panel.

The present disclosure provides a new method for driving the VA liquid crystal display panel in order to realize low color shift display effect through charge sharing method when the shutter glass 3D display technology is applied. According to the present method, the sequence of the scanning signal to be provided can be recombined through the connection methods of the scanning lines of the pixels of the liquid crystal display panel. In the following embodiment, the liquid crystal display panel is a VA liquid crystal display panel, the source 3D images are realized through the shutter glass 3D display technology, and the low color shift display effect of the liquid crystal display panel is realized through charge sharing method, unless the context clearly dictates otherwise.

Figure 2:
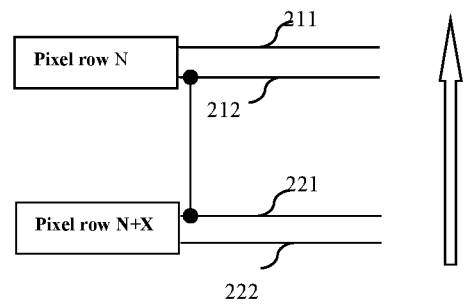
FIG. 2 schematically shows pixels in two rows of a liquid crystal display panel according to one embodiment of the present disclosure.

The basic principle of the present method will be illustrated below. FIG. 2 schematically shows a pixel row group selected from the liquid crystal display panels as shown in FIG. 1 in a random manner. According to the present embodiment, in 2D display mode, the scanning signals are provided to the first scanning lines of the pixel rows in sequence of the pixel rows themselves. That is, the scanning signal is provided to the first scanning line 211 of the pixel row N, and the scanning signal is provided to the first scanning line 221 of the pixel row N+X after X scanning cycles. Since the second scanning line 212 of the pixel row N is connected with the first scanning line 221 of the pixel row N+X, as to the pixel row N, first, the first scanning line 211 receives the scanning signal, so that the first switching unit is turned on and the corresponding pixel unit is charged; and then, after X scanning cycles, the second scanning line 212 receives the scanning signal, so that the second switching unit is turned on and a charge of the corresponding pixel unit is shared. As each pixel electrode has a pre-charge time, the color shift phenomenon during display process can be reduced.

In 3D display mode, the sequence of the scanning signal to be provided is adjusted, as shown by an arrow in FIG. 2. That is, as to the pixel row N, first, the scanning signal is provided to the second scanning line 212, so that the second switching unit is turned on; and then, after X scanning cycles, the scanning signal is provided to the first scanning line 211, so that the first switching unit is turned on and a corresponding pixel unit is charged by image data information of a data line. Since the second scanning line 212 of the pixel row N is connected with the first scanning line 221 of the pixel row N+X, as to the pixel row N+X, first, the first scanning line 221 receives the scanning signal, so that the first switching unit is turned on; and then, after P−X scanning cycles, the second scanning line 222 receives the scanning signal, so that the second switching unit is turned on.

According to the present embodiment, P scanning cycles being equal to a scanning time needed to display one frame image is taken as an example. The second switching unit is always turned on X scanning cycles prior to the first switching unit. From other perspective, first, the first switching unit is turned on and the corresponding pixel unit is charged; and then, after P−X scanning cycles, the second switching unit is turned on and a charge of the corresponding pixel unit is shared. Since in general, X is far less than P, in the signal providing method according to the present disclosure, the charge sharing function during each frame is shut off. In this case, a polarity of image data information of a pixel is not necessarily reversed once through each frame. The polarity of the image data information of the pixel is reversed once through each two frames, so that the 3D image spiking caused by "the left-eye frame images always have the same polarity (for example, positive polarity), and the right-eye frame images always have another polarity (for example, negative polarity)" can be avoided, and thus the shutter glass 3D images can be displayed normally.

According to the method of the present disclosure, the sequence of the scanning signal to be provided in 2D display mode can be adjusted based on the connection mode of the scanning lines of the pixel rows of the liquid crystal display panel and the above principle, so that the sequence of the scanning signal to be provided in 3D display mode can be obtained. The simplest method is that the scanning signals in 3D display mode are provided in completely reverse order as the sequence of the scanning signal to be provided in 2D display mode. It should be noted that, the above method is just a commonly used one. During practical applications, the scanning signals in 3D display mode can be provided in accordance with a plurality of sequences based on the above basic principle.

The methods through which the sequence of the scanning signals to be provided in 3D display mode is obtained will be discussed in detail below in combination with a plurality of embodiments.

Figure 3A:
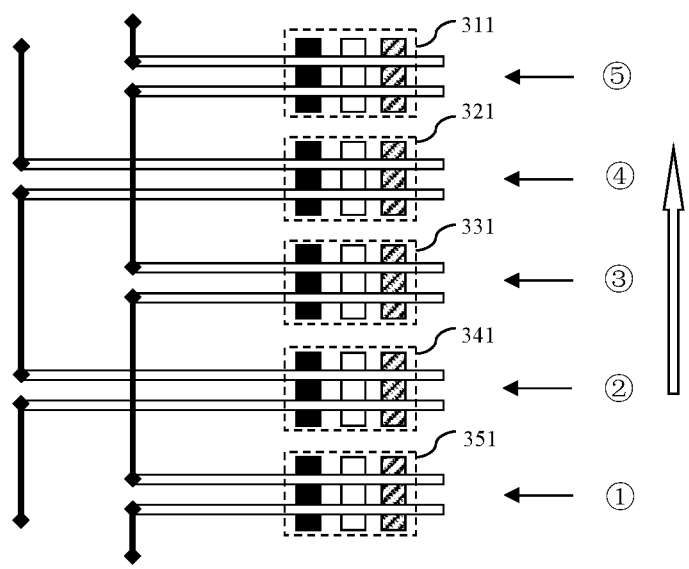
FIGS. 3A and 3B schematically show a sequence of a scanning signal to be provided according to one embodiment of the present disclosure.

According to one embodiment of the present disclosure, X=2 is selected, which is shown in FIG. 3A. Pixel rows 311, 321, 331, 341, and 351 are some of the pixel rows of the liquid crystal display panel, and each pixel row comprises a first scanning line and a second scanning line. The second scanning line of the pixel row 311 is connected with the first scanning line of the pixel row 331; the second scanning line of the pixel row 321 is connected with the first scanning line of the pixel row 341; and the second scanning line of the pixel row 331 is connected with the first scanning line of the pixel row 351. In 2D display mode, the scanning signals of the liquid crystal display panel are provided in sequence of 311, 321, 331, 341, and 351.

Figure 3B:
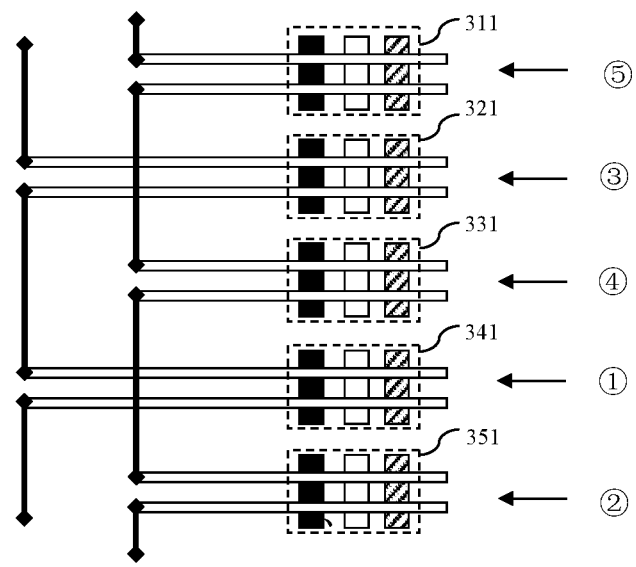

According to the method of the present disclosure, the pixel rows are grouped. There are X pixel rows in each group at most, i.e., two pixel rows. In the situations as shown in FIGS. 3A and 3B, three pixel row groups are established, i.e., {A1}={311}, {A2}={321, 331}, and {A3}={341, 351}. The scanning signals of the pixel rows in the group {A3} can be provided in sequence of {341, 351} or {351, 341}, and the scanning signals of the pixel rows in the group {A2} can be provided in sequence of {321, 331} or {331, 321} accordingly.

In this case, the 3D scanning signals can be provided in sequence of 351, 341, 331, 321, and 311 (as shown in FIG. 3A) or in sequence of 341, 351, 321, 331, and 311 (as shown in FIG. 3B). It should be noted that, FIGS. 3A and 3B only show a part of the liquid crystal display panel, and some of the pixel rows are not shown therein. The group {A1} only comprises one pixel row. However, the sequence of the scanning signal to be provided shown in the present embodiment is only used for facilitating the understanding of the grouping and ordering method of the present disclosure for the skilled in the art. During practical applications, the pixel rows can be grouped and ordered according to specific situation and based on the method of the present disclosure.

Figure 4A:
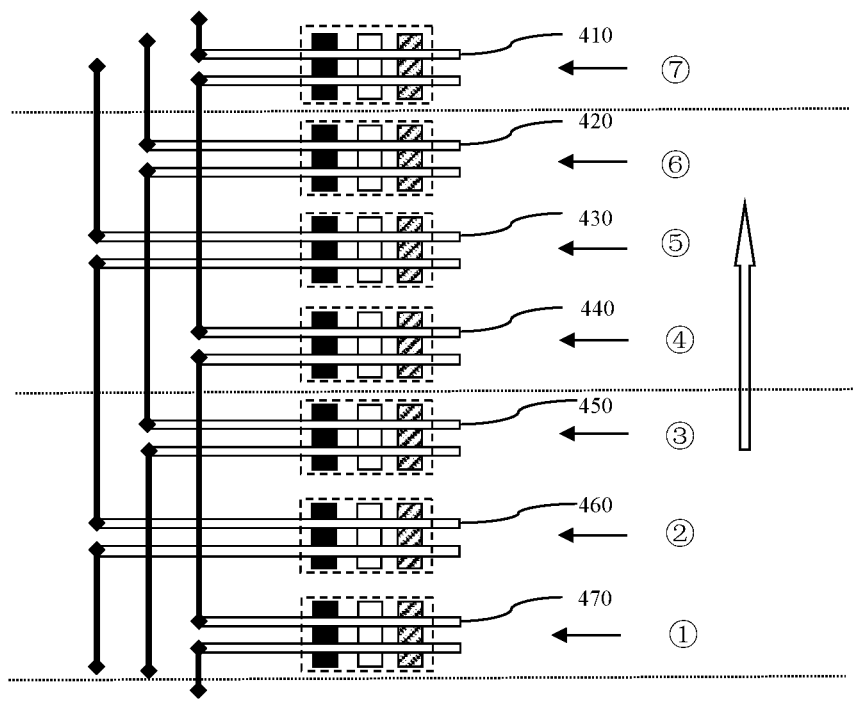
FIGS. 4A to 4D schematically show a sequence of a scanning signal to be provided according to another embodiment of the present disclosure.
Figure 4B:
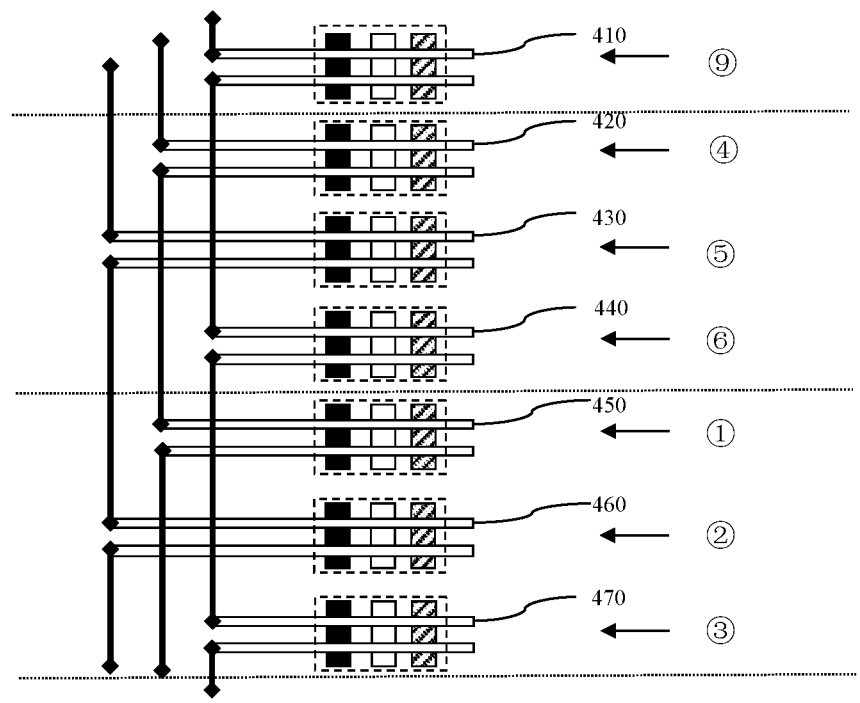
Figure 4C:
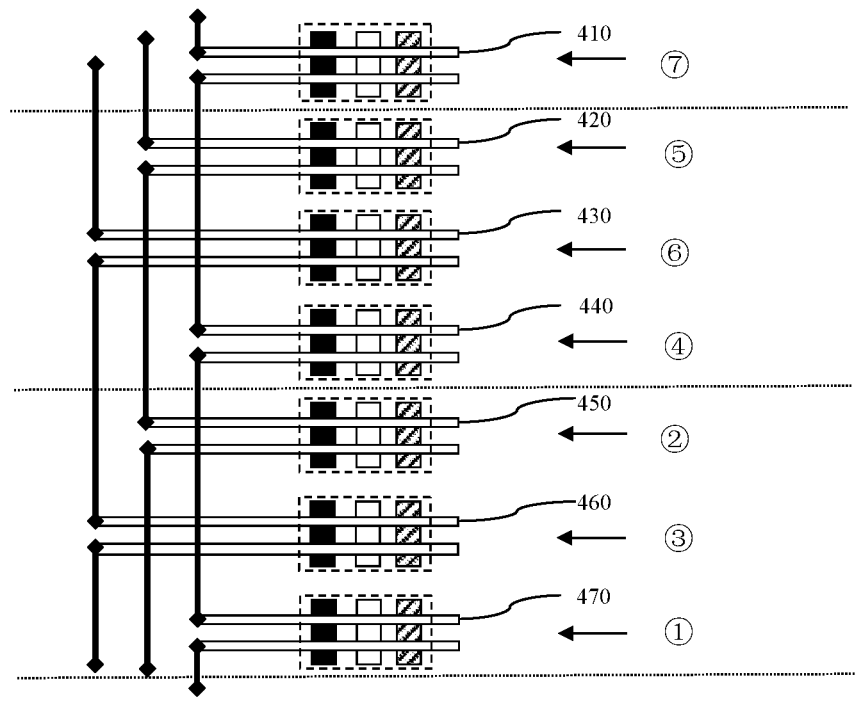
Figure 4D:
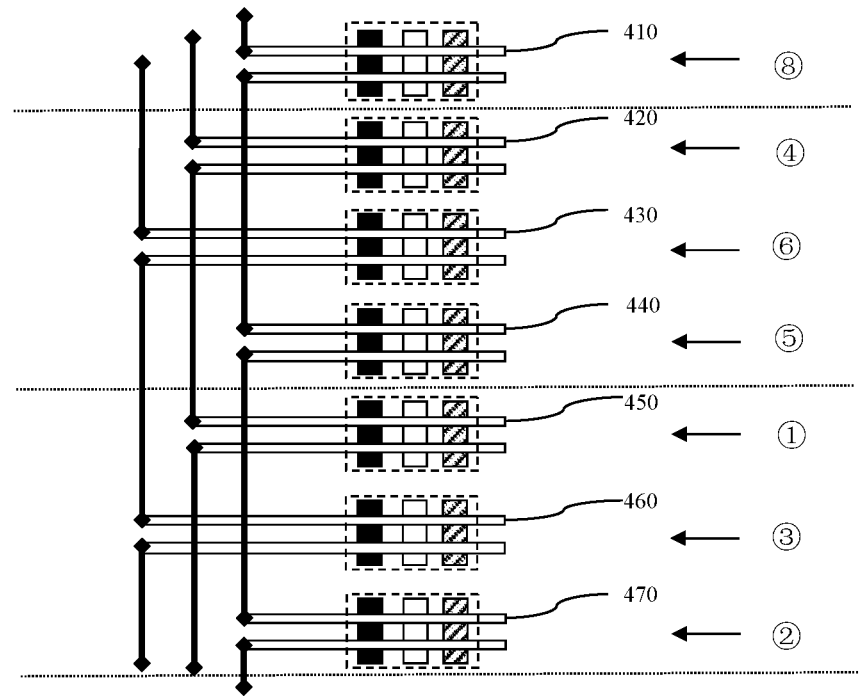

In actual situation, X can have different values. According to another embodiment of the present disclosure, X=3 is selected, which are shown in FIGS. 4A-4D. The pixel rows are grouped with each three rows as a pixel row group. The scanning signals in 3D display mode can be provided in completely reverse order as the sequence of the scanning signal to be provided in 2D display mode with one pixel row group as a unit. Since there are three pixel rows in one pixel row group, the scanning signals of the pixel rows in each pixel row group can be provided in at least four methods. Reference can be made to FIGS. 4A-4D, wherein pixel rows 410, 420, 430, 440, 450, 460, and 470 of the liquid crystal display panel are shown, and boundaries among groups which are divided with X (here, X=3) pixel rows as one pixel row group are shown by dotted lines. If the scanning signals in 2D display mode are provided in the sequence of 410, 420, 430, 440, 450, 460, and 470, according to the method of the present disclosure, it can be obtained that the scanning signals in 3D display mode can be provided in the sequences of:

470, 460, 450, 440, 430, 420, as shown in FIG. 4A;
450, 460, 470, 420, 430, 440, as shown in FIG. 4B;
470, 450, 460, 440, 420, 430, as shown in FIG. 4C; and
450, 460, 420, 440, 430, as shown in FIG. 4D.

According to the method of the present disclosure, it can be seen that, the sequence of the scanning signal to be provided in 3D display mode can be obtained only through reversing the sequence of the scanning signal to be provided in 2D display mode whatever the value of X is. Therefore, according to one embodiment of the present disclosure, the scanning signals in 3D display mode are provided in completely reverse order as the sequence of the scanning signal to be provided in 2D display mode. As shown in FIG. 3A, the scanning signals in 2D display mode are provided in the sequence of 311, 321, 331, 341, and 351, and the scanning signals in 3D display mode are provided in the sequence of 351, 341, 331, 321, and 311.

According to the above method, through changing the sequence of the scanning signal to be provided of each pixel row, it can be guarantee that the second switching unit in one pixel row is always turned on X scanning cycles prior to the first switching unit in the same pixel row without affecting the normal work of the liquid crystal display panel, whereby the charge sharing function can be shut off. In this case, a polarity of image data information of a pixel is not necessarily reversed once through each frame cycle. The polarity of the image data information of the pixel is reversed once through each two frame cycles, so that the 3D image spiking which would be caused when the polarity of the image data information of the pixel is reversed once through each frame cycle can be avoided.

When the sequence of the scanning signal to be provided is changed, the output sequence of the image signals should be changed accordingly in order to guarantee the normal display of the image. For example, according to one embodiment of the present disclosure, the sequence of the scanning signal to be provided in 3D display mode is obtained through reversing the sequence of the scanning signal to be provided in 2D display mode. In this case, the new 3D image which needs to be output can be obtained through rotating the source 3D image about a horizontal central axis thereof.

At last, the scanning signals are output according to the sequence of the scanning signal to be provided in 3D display mode, so that the reconstructed image can be displayed and the 3D display effect can be achieved.

Figure 5:
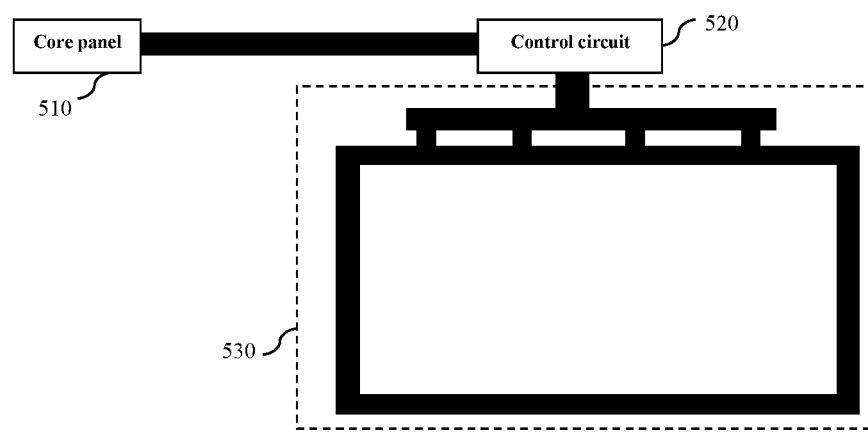
FIG. 5 schematically shows a VA liquid crystal display system according to one embodiment of the present disclosure.

FIG. 5 schematically shows a liquid crystal display system according to one embodiment of the present disclosure.

As shown in FIG. 5, a core panel of a television comprises an image reconstruction unit and an image output unit. In 2D image display mode, the image is output by the core panel 510 of the television, and the scanning signals are output by a liquid crystal display panel control circuit 520 according to the sequence of the 2D scanning signals to be provided, so that a 2D image with low color shift is displayed on a liquid crystal display panel 530 based on data information corresponding to an original image frame in 2D display mode.

According to the method of the present disclosure, under the shutter glass 3D image display mode, the source 3D image is reconstructed by the image reconstruction unit of the core panel 510 of the television according to the sequence of the 3D scanning signals to be provided, so that a new 3D image is generated and output. During this process, no hardware setting in the prior display system needs to be changed. Then, the scanning signals are output by the control circuit 520 according to the sequence of the 3D scanning signals to be provided, and the new 3D image is displayed on the liquid crystal display panel 530. In this manner, the 3D display effect can be realized. According to the present embodiment, the source 3D image is rotated through 180 degrees about a horizontal central axis thereof in the core panel of the television, so that a new 3D image is generated and output. In this case, the scanning signals are output by the control circuit 520 in completely reverse order as the sequence of the scanning signal to be provided in 2D display mode, so that the new 3D image is displayed on the liquid crystal display panel 530. According to the present embodiment, the phenomenon like "direct current residue" during 3D image display process can be eliminated.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:
1. A method for driving a liquid crystal display panel, in 3D display mode, said method comprising the following steps:
   providing a scanning signal to a second scanning line of a pixel row N, so as to turn on a second switching unit; and
   providing, after X scanning cycles, a scanning signal to a first scanning line of the pixel row N to turn on a first switching unit, so that a corresponding pixel unit is charged by image data information of a data line,
   wherein the second scanning line of the pixel row N is connected with a first scanning line of a pixel row N+X, N ranging from 0 to P-X, X ranging from 0 to m, P and m being positive integers, P being larger than m, and P scanning cycles being equal to a scanning period needed to display one frame image; and
   wherein said image data information is data information corresponding to an image obtained after an original image is reconstructed, and a polarity of said image data information is reversed once through each two frames.
2. The method according to claim 1,
in 2D display mode, said method comprising the following steps:
   providing a scanning signal to the first scanning line to turn on the first switching unit, thereby charging the corresponding pixel unit;

providing, after X scanning cycles, a scanning signal to the second scanning line to turn on the second switching unit, so that a charge of a corresponding pixel unit is shared to reduce color shift.

3. The method according to claim 1, wherein said liquid crystal display panel is a vertical alignment liquid crystal panel with P pixel rows;
wherein the color shift of the liquid crystal panel is reduced through charge sharing method; and
wherein said 3D display mode is realized through a shutter glass 3D display technology.

4. The method according to claim 1, further comprising:
grouping pixel rows taking X pixel rows as an unit and according to a sequence of the scanning signal to be provided in 2D display mode, so that it is guaranteed that all other groups except a first group comprise X pixel rows, and G pixel row groups are obtained, wherein a sequence of the scanning signal to be provided to said G pixel row groups in 3D display mode is opposite to that in 2D display mode.

5. The method according to claim 4, wherein a sequence of the scanning signal to be provided to the pixel rows in one pixel row group corresponds to that in other groups.

6. A liquid crystal display device, comprising:
a liquid crystal panel;
a core panel, comprising:
an image reconstruction unit, used for reconstructing an original image frame in 3D display mode; and
an image output unit, used for outputting data information corresponding to the original image frame in 2D display mode, and outputting data information corresponding to a reconstructed image in 3D display mode; and
a display panel control circuit board, used for providing a driving signal to said display panel in accordance with a following driving method, so that a 2D image with low color shift is displayed based on data information corresponding to an original image frame in 2D display mode, and a 3D image without image spiking is displayed based on data information corresponding to a reconstructed image in 3D display mode,
in 3D display mode, said driving method comprising the following steps:
providing a scanning signal to a second scanning line of a pixel row N, so as to turn on a second switching unit; and
providing, after X scanning cycles, a scanning signal to a first scanning line of the pixel row N to turn on a first switching unit, so that a corresponding pixel unit is charged by image data information of a data line,
wherein the second scanning line of the pixel row N is connected with a first scanning line of a pixel row N+X, N ranging from 0 to P-X, X ranging from 0 to m, P and m being positive integers, P being larger than m, and P scanning cycles being equal to a scanning period needed to display one frame image; and
wherein said image data information is a data information corresponding to an image obtained after an original image is reconstructed, and an polarity of said image data information is reversed once through each two frames.

7. The liquid crystal display device according to claim 6, in 2D display mode, said driving method comprising the following steps:
providing a scanning signal to the first scanning line to turn on the first switching unit, thereby charging the corresponding pixel unit;
providing, after X scanning cycles, a scanning signal to the second scanning line to turn on the second switching unit, so that a charge of a corresponding pixel unit is shared to reduce color shift.

8. The liquid crystal display device according to claim 6, wherein pixel rows are grouped taking X pixel rows as an unit and according to a sequence of the scanning signal to be provided in 2D display mode, so that it is guaranteed that all other groups except a first group comprise X pixel rows, and G pixel row groups are obtained; and
wherein a sequence of the scanning signal to be provided to said G pixel row groups in 3D display mode is opposite to that in 2D display mode.

9. The liquid crystal display device according to claim 8, wherein a sequence of the scanning signal to be provided to the pixel rows in one pixel row group corresponds to that in other groups.

10. The liquid crystal display device according to claim 6, wherein said image reconstruction unit reconstructs an image based on a sequence of a scanning signal to be provided to a pixel row.

11. The liquid crystal display device according to claim 6, wherein said image reconstruction unit rotates the original image frame about a horizontal central axis so as to obtain the reconstructed image.

* * * * *